(12) United States Patent
Ault et al.

(10) Patent No.: US 6,377,994 B1
(45) Date of Patent: *Apr. 23, 2002

(54) METHOD AND APPARATUS FOR CONTROLLING SERVER ACCESS TO A RESOURCE IN A CLIENT/SERVER SYSTEM

(75) Inventors: Donald Fred Ault, Hyde Park; John Carr Dayka, Highland, both of NY (US); Eric Charles Finkelstein, South Caulfield (AU); Richard Henry Guski, Red Hook, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 859 days.

(21) Appl. No.: 08/632,251

(22) Filed: Apr. 15, 1996

(51) Int. Cl.$^7$ .............................................. G06F 15/16
(52) U.S. Cl. ........................ 709/229; 709/202; 709/203; 709/225; 707/9; 707/104.1; 713/155; 713/164; 713/182; 713/200; 713/201; 713/202
(58) Field of Search .................................. 395/200, 800, 395/700, 600, 187.01, 168.01, 200.32, 200.33, 200.55, 200.56, 200.59, 185, 188.01; 380/21, 23, 25, 28, 30, 3, 4, 277, 283; 709/200–203, 225–226, 229; 707/1, 9, 104.1; 713/155–159, 161, 154–157, 182–185, 200–202

(56) References Cited

U.S. PATENT DOCUMENTS

| | | | |
|---|---|---|---|
| 5,173,939 A | * 12/1992 | Abadi et al. .................... | 707/9 |
| 5,187,790 A | * 2/1993 | East et al. .................... | 704/315 |
| 5,204,961 A | * 4/1993 | Barlow ........................ | 713/201 |
| 5,210,795 A | * 5/1993 | Lipner et al. ............... | 713/187 |

(List continued on next page.)

OTHER PUBLICATIONS

IBM Manual, CICS Transaction Server for OS/390, CICS RACF Security Guide, Release 2, SC33–1801–01, 1997.

IBM Manual, CICS/ESA, CICS–RACF Security Guide, Version 3, Release 3, SC33–0749–01, 1992.

IBM Manual, CICS–RACF Security Guide, CICS for MVS/ESA, Version 4, Release1, 1994.

(List continued on next page.)

*Primary Examiner*—Bharat Barot
(74) *Attorney, Agent, or Firm*—William A. Kinnaman, Jr.

(57) ABSTRACT

In a client/server system, a method and apparatus for handing requests for access to a host resource purportedly on behalf of a client from an untrusted application server that may be capable of operating as a "rogue" server. Upon receiving a service request from a client, an untrusted application server creates a new thread within its address space for the client and obtains from the security server a client security context, which is anchored to the task control block (TCB) for that thread. The client security context specifies the client and indicates whether the client is an authenticated client or an unauthenticated client. When the application server makes a request for access to a host resource purportedly on behalf of the client, the security server examines the security context created for the requesting thread. If the client security context indicates that the client is an authenticated client, the security server grants access to the host resource if the client specified in the client security context is authorized to make the requested access to the host resource. If the client security context indicates that the client is an authenticated client, the security server grants access to the host resource only if both the client specified in the client security context and the application server are authorized to make the requested access to the host resource.

12 Claims, 4 Drawing Sheets

U.S. PATENT DOCUMENTS

| | | | | | |
|---|---|---|---|---|---|
| 5,220,603 | A | * | 6/1993 | Parker | 713/156 |
| 5,224,163 | A | * | 6/1993 | Gasser et al. | 380/30 |
| 5,235,642 | A | * | 8/1993 | Wobber et al. | 713/156 |
| 5,237,614 | A | * | 8/1993 | Weiss | 713/159 |
| 5,263,157 | A | * | 11/1993 | Janis | 709/217 |
| 5,263,158 | A | * | 11/1993 | Janis | 707/1 |
| 5,263,165 | A | * | 11/1993 | Janis | 711/153 |
| 5,321,841 | A | * | 6/1994 | East et al. | 709/107 |
| 5,339,403 | A | * | 8/1994 | Parker | 713/156 |
| 5,349,642 | A | * | 9/1994 | Kingdor | 713/161 |
| 5,481,720 | A | * | 1/1996 | Loncks et al. | 709/229 |
| 5,495,533 | A | * | 2/1996 | Linehar et al. | 713/155 |
| 5,537,642 | A | * | 7/1996 | Glowing et al. | 713/200 |
| 5,586,260 | A | * | 12/1996 | Hu | 709/229 |
| 5,678,041 | A | * | 10/1997 | Baker et al. | 709/229 |
| 5,689,638 | A | * | 11/1997 | Sadovsky | 713/202 |
| 5,764,890 | A | * | 6/1998 | Glasser et al. | 713/202 |
| 5,815,665 | A | * | 9/1998 | Teper et al. | 709/229 |

OTHER PUBLICATIONS

Harroun, P.C., "Detection and Elimination of Unauthorized Resource Access Control Facility Privileges", IBM Technical Disclosure Bulletin, vol. 36, No. 03, Mar. 1993, p. 77.*

Steiner, J.G. et al., "Kerberos: An Authentication Service for Open Network Systems", USENIX Winter Conference, Feb. 9–12, 1988, Dallas, Texas, pp. 191–202.*

Stevens, W.R., "UNIX Network Programming", PTR Prentice–Hall, Inc., Englewood Cliffs, New Jersey, 1990, pp. 431–436.*

"MVS/ESA OpenEdition DCE: RACF and DCE Security Interoperation" IBM International Technical Support Centers, IBM order No. GG24–2526–00, Apr., 1995.*

"Security Server (RACF) Support for: OpenEdition DCE, SOMobjects for MVS, and System View for MVS", IBM order No. GC28–1924–00, Mar. 1996.*

* cited by examiner

METHOD AND APPARATUS FOR CONTROLLING SERVER ACCESS TO A RESOURCE IN A CLIENT/SERVER SYSTEM

BACKGROUND OF THE INVENTION

1. Field of the Invention

This invention relates to access control in a distributed system and, more particularly, to a method and apparatus for controlling server access to a resource in a client/server system.

2. Description of the Related Art

Client/server systems are well known in the field of data processing. In a client/server system, a "client" process issues a request to a "server" process to perform a service for it. In response, the server transmits a reply to the client, notifying it of the results of the service. Often, the client process executes on a personal workstation, while the server process executes on a central "host" processor; however, this is not required and the two processes can run on the same machine. The service may be accessing or printing a file, executing an application, or some more specialized service such as providing access control as described below.

The terms "client" and "server" are relative to the service in question. Thus, the same process may be performing a service for a first process while requesting a service (such as access to a resource) from a second. The intermediary process functions as a server relative to the first process and as a client relative to the second.

Server processes of this latter type that request access to resources on behalf of clients present special security problems. For the purpose of gauging their security exposures, servers may be categorized into two general types: trusted servers and untrusted servers. Servers are considered to be "trusted" (or "authorized") if they originate from the entity making the determination (usually the vendor of the operating system) or have otherwise been carefully examined so as to provide a high degree of assurance that they are free from malicious code. Servers that cannot be vouched for in sense are regarded as "untrusted" (or "unauthorized") servers.

Providing security contexts, which are authenticated identities, for client users in client/server applications where the server executes on a host system causes the client to have a host identity whose "scope of access authority" includes resources within the entire host system. If not controlled, this compromises the security and integrity of the entire host system. In the prior art, the only way to control the scope of authority of clients was to make the server code "authorized" and carefully inspect any such code to make sure that it didn't misbehave.

SUMMARY OF THE INVENTION

In accordance with the present invention, unauthorized servers will be able to issue new security service requests to have security contexts created for their clients—they could do this before only if they were authorized. With the new service, the security contexts created will be flagged as unauthenticated client security contexts. This is because the host system cannot assume that the "unauthorized" code had not manipulated the request (via trojan-horse code for example) to acquire the authenticated identity of someone other than the true client or to use a valid client's identity to do something nasty. Later, when any authorization checking request comes to the host system from any resource manager on the host system because the server acting at the request of the client has "asked for" access to some resource, the host system will require that both the client and the server be authorized to the resource. Thus, the server cannot access any resources outside of its own scope of access authority.

More particularly, the present invention contemplates a method and apparatus for handing requests for access to a resource purportedly on behalf of a client from an untrusted application server in a client/server system, that may be capable of operating as a "rogue" server. Upon receiving a service request from a client, an untrusted application server creates a new thread within its address space for the client and obtains from the security server a client security context, which is anchored to the task control block (TCB) for that thread. The client security context specifies the client and indicates whether the client is an authenticated client or an unauthenticated client.

When the application server makes a request for access to a resource purportedly on behalf of the client, the security server examines the security context created for the requesting thread. If the client security context indicates that the client is an authenticated client, the security server grants access to the resource if the client specified in the client security context is authorized to make the requested access to the resource. If the client security context indicates that the client is an unauthenticated client, the security server grants access to the resource only if both the client specified in the client security context and the application server are authorized to make the requested access to the resource.

With the present invention, the scope of access authority of a client can be limited to only resources that the server itself also has authority to. All other resources within the host system are not accessible by such a client user (while the user is a client user), even though the user may have access authority to other resources when not executing as a client. The servers are no longer required to be authorized or code inspected. Host systems incorporating the present invention thus become much more attractive platforms for the development of server applications.

DESCRIPTION OF THE PREFERRED EMBODIMENTS

Figure 1:
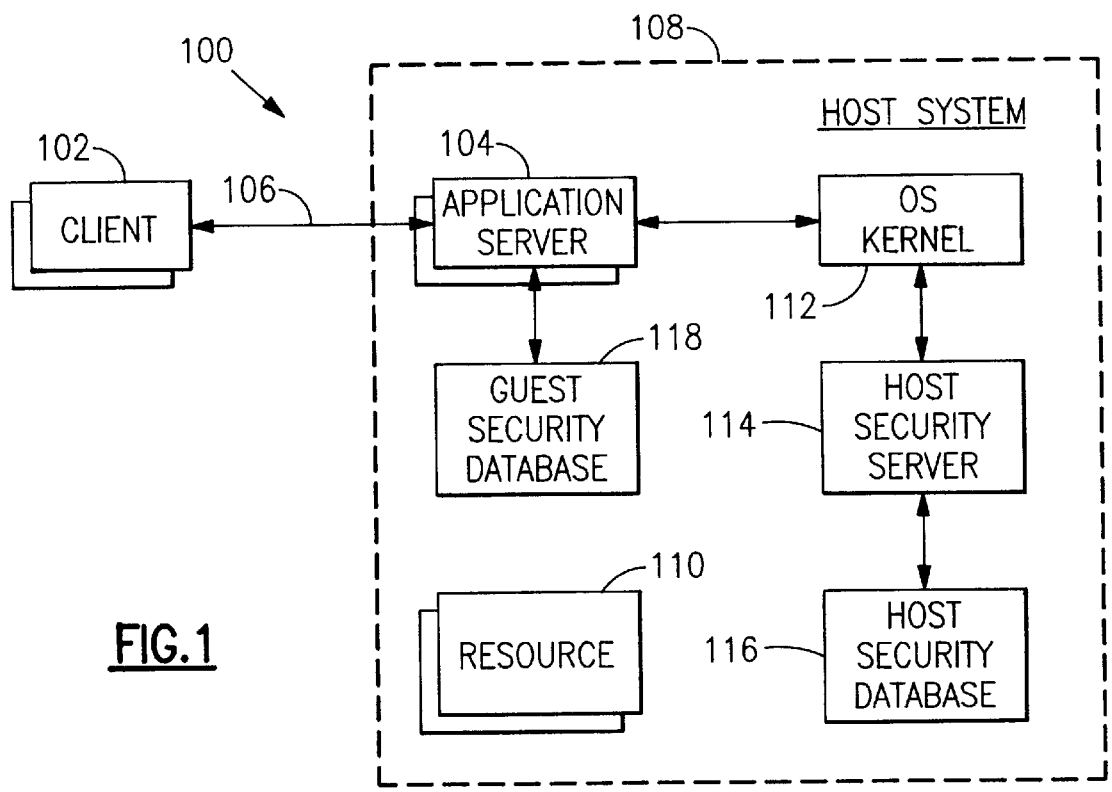
FIG. 1 is a schematic block diagram of a client/server system incorporating the present invention.

Referring to FIG. 1, an exemplary client/server system 100 incorporating the present invention includes one or more clients 102 and one or more application servers 104 responsive to requests from the clients. Clients 102 and servers 104 intercommunicate via a communications path 106.

Clients 102 are processes that run either on separate workstations (not separately shown) or on a common workstation. Application servers 104 are processes that run on a host system 108. Host system 108 also includes one or more resources 110 accessed by application servers 104 on behalf of their clients 102, an operating system (OS) kernel 112, a host security server 114 for controlling access to resources 110, a host security database 116 containing access control information used by the host security server, and a "guest" security database 118 containing access control information used by "guest" application servers as described below. In the embodiment shown, it will be assumed that host system 108 is an IBM System/390 (S/390) processor, OS kernel 112 is the MVS OpenEdition kernel of the IBM OS/390 operating system, and that host security server 114 is the IBM Resource Access Control Facility (RACF), a component of OS/390. (IBM, System/390, S/390, MVS, OpenEdition, OS/390 and RACF are trademarks or registered trademarks of International Business Machines Corporation, the assignee.) The present invention is not limited to such a configuration, however.

As noted above, application servers 104 are either trusted servers (also referred to herein as "authorized" or "host" servers) that are assumed to be free of malicious code or untrusted servers (also referred to herein as "unauthorized" or "guest" servers) that are not assumed to be free of malicious code. Guest application servers 104 are allowed to run on the host system 108, but with restricted access privileges as compared with host application servers. Although the present invention is not limited to any particular guest application servers 104, in the disclosed embodiment it will be assumed that they are DCE servers conforming to the protocols of the Open Software Foundation (OSF) Distributed Computing Environment (DCE) and that the clients 102 are DCE clients whose requests cause the application server to access non-DCE (i.e., host) resources.

Host security database 116 contains data defining the access rights of entities such as clients 102 and servers 104 seeking access to resources 110. As a prerequisite to determining the access rights of users seeking access to a resource, users are authenticated, i.e., established in some satisfactory manner (as by a password or other credentials) as being the entities they purport to be. In the disclosed system 100, users may be authenticated either to the host security server 114 (using a password or other credentials recognized by the host security server) or to DCE or some other guest system (using a password or other credentials recognized by the guest security server). Clients 102 that are not authenticated to the host security server 114 (even though they may be authenticated to a guest system such as DCE) are referred to herein as "unauthenticated" clients. Application servers 104 may access resources on behalf of such "unauthenticated" clients 102, but with additional restrictions as described below.

Each DCE user (or principal, to use the conventional DCE term) has what is known as a unique universal identifier (UUID) that specifies the user's identity in a DCE environment. A DCE client 102 authenticates itself to a DCE application server 104 by presenting satisfactory credentials to the server, which then accesses the guest security database 118 to verify the credentials and authenticate the DCE client. DCE credentials take the form of a privilege attribute certificate (PAC) specifying among other things the UUID of the client principal 102 and the groups of which the principal is a member. The manner in which PACs are formed under the DCE protocol is well known in the art and forms no part of the present invention. Further information on this an other aspects of the present invention may be found, however, in the IBM publications MVS/ESA OpenEdition DCE: RACF and DCE Security Interoperation, GG24-2526-00 (1995); and OS/390 Security Server (RACF) Support for: OpenEdition DCE, SOMobjects for MVS, SystemView for MVS, GC28-1924-00 (1996). Both of these publications are incorporated herein by reference.

In a similar manner, each native (i.e., non-guest) user of the host system 108 has a host userid (a RACF userid in the example shown) and host authentication credentials such as a static or dynamic password. A client 102 having a host userid authenticates itself to the host security server 114 by presenting its credentials to the server, which then accesses the host security database 116 to verify the credentials and authenticate the client.

Although authentication functions in the host system 108 are split between the host security server 114 and guest application servers 104 (or their security servers if different) in the manner described above, access by authenticated users to host resources 110 is controlled by the host security server 114 alone. To facilitate this, host security database 116 maps guest userids (such as DCE UUIDs) to corresponding host userids so that similar access control procedures (with the exceptions noted) may be used for both native users and "guest" users such as DCE principals.

Figure 6:
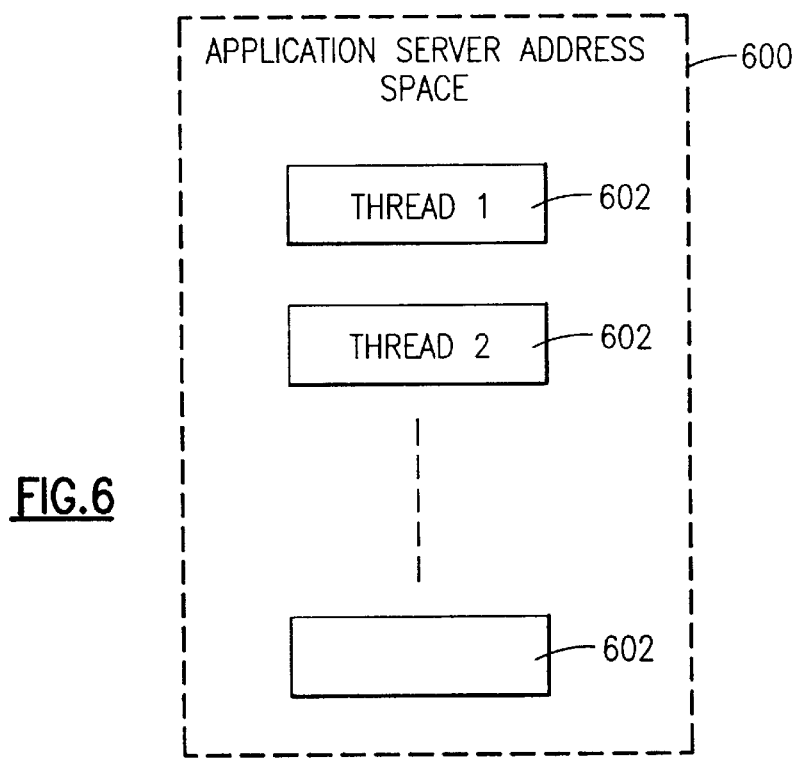
FIG. 6 shows the makeup of an application service address space.
Figure 7:
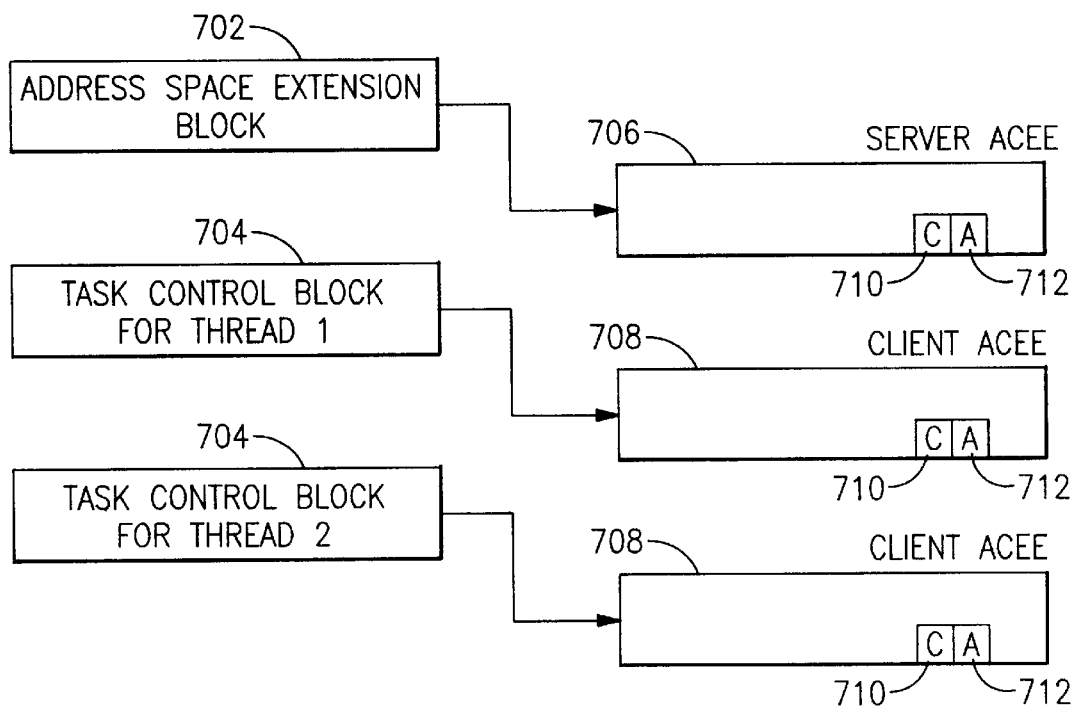
FIG. 7 shows the anchoring of accessor environment elements (ACEEs) to the address space extension block and task control blocks of an address space.

Referring to FIG. 6, application server 104 executes within a server address space 600 that includes one or more client threads 602; server address space 600 has one client thread 602 for each client 102 currently being processed. Referring to FIG. 7, server address space 600 and each of the client threads 602 within the server address space has an accessor environment element (ACEE) or security context that is used for the purposes of access control, as described below. (The terms "ACEE" and "security context" are used synonymously in this specification.) Thus, server address space 600 has an address space extension block (ASXB) 702 containing a pointer to a server ACEE 706, while each client thread 602 has a task control block (TCB) 704 containing a client ACEE 708. Each of ACEEs 704 and 708 contains various fields identifying the user in question; these fields include a "client" field (C) 710 indicating whether the ACEE is a client ACEE and an "authenticated" field (A) 712 indicating whether the ACEE is an authenticated client ACEE.

Figure 2:
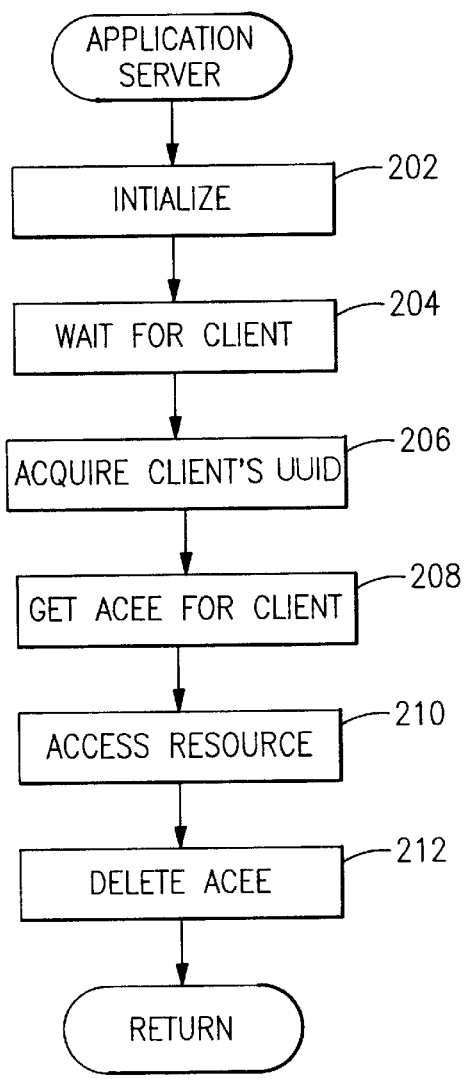
FIG. 2 shows the steps performed by an application server of the system of FIG. 1 to create a security context for a client and to access a resource on behalf of a client.

FIG. 2 shows the procedure followed by an application server 104 to handle requests from clients 102. After initializing (step 202), the application server 104 waits for a service request from a client 102 (step 204). If the client 102 is a DCE client, the service request may be in the form of a remote procedure call (RPC) containing, among other things, the client's PAC.

Upon receiving the service request from the client 102, the application server 104 issues a request to the guest security database 118 to obtain the client's credentials (including the UUID) from the PAC transmitted as part of the RPC (step 206).

The application server 104 then creates a new thread 602 within its address space 600 for the client 102 and "customizes" the thread with the client's host identity (i.e., its host userid) by issuing a service request containing the client's UUID to the OS kernel 112 to obtain an ACEE 708 for the client (step 208). If the client 102 has presented host authentication credentials to the application server 104, these also are passed along to the OS kernel 112, thence to the host security server 114, to permit the host security server to authenticate the client and give it an "authenticated client" ACEE 708.

Figure 3:
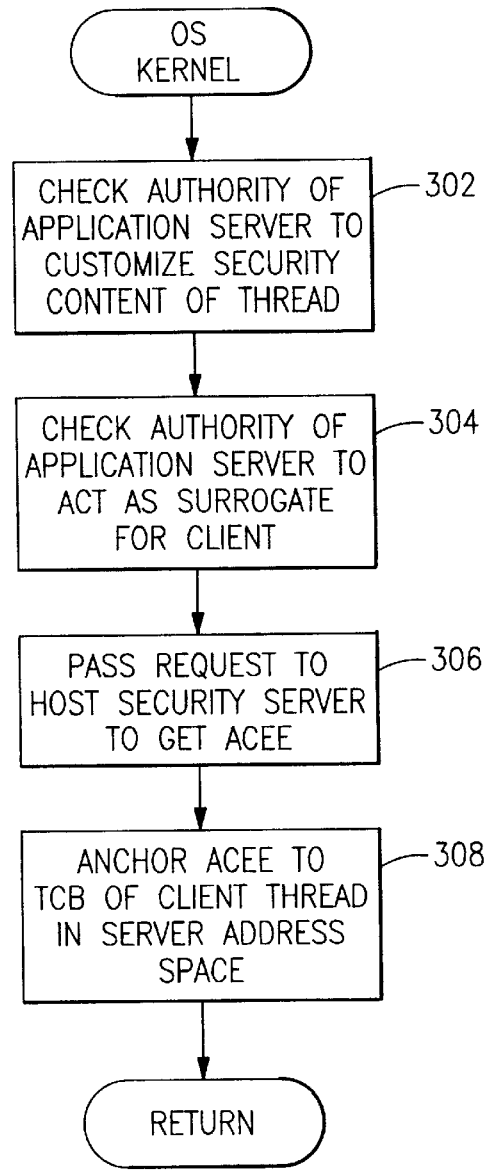
FIG. 3 shows the steps performed by the operating system kernel of the system of FIG. 1.

Referring to FIG. 3, upon receiving this service request from the application server 104, the OS kernel 112 checks the authority of the application server 104 to use the kernel service to customize the security content of the thread 602 (step 302).

The OS kernel 112 then checks the authority of the application server to act as a surrogate of the host userid corresponding to the DCE client (step 304).

The OS kernel 112 then invokes the services of the security server 114 to build a task-level ACEE 708 for the host userid of the client 102 (step 306).

Trusted application servers 104 may act as a surrogate for the client 102, meaning that only the client's host identity and authorizations are used in resource access decisions processed by the security server 114.

In contrast, untrusted application servers 104 may not act as a surrogate of the client 102, and two identities are used in local access control decisions on the host system 108: (1) the identity of the client 102 and (2) the identity of the server 104. As described below, security server 114 enforces the requirement that both the host userid associated with the client 102 and the host userid associated with the server 104 be authorized to the resource 110 being checked.

Figure 4:
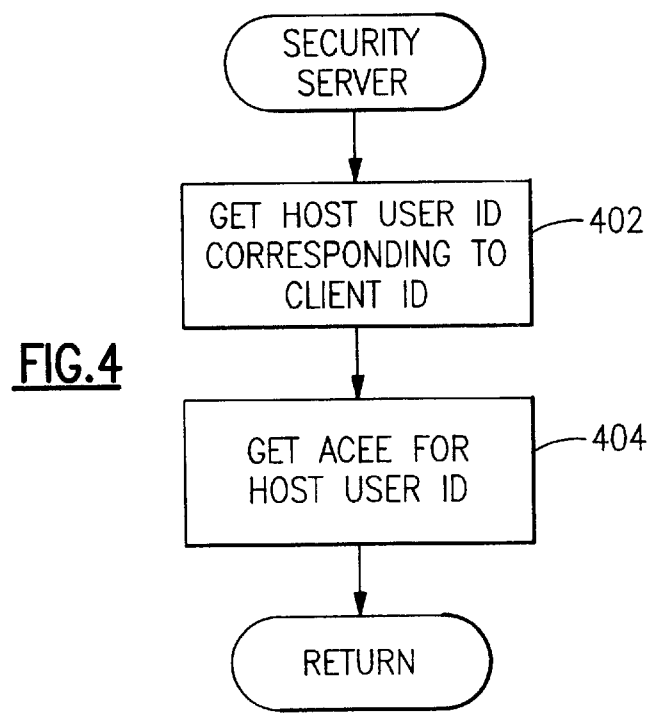
FIG. 4 shows the steps performed by the host security server of the system of FIG. 1 to create a client security context.

Referring to FIG. 4, upon being invoked by the OS kernel 112 the security server 114 accesses the security database 116 to obtain the host userid corresponding to the client UUID (step 402) and creates an ACEE 708 for the client's host userid, which it passes back to the OS kernel 112 (step 404).

The type of client ACEE 708 created in step 404 depends on the authentication status of the client as well as the trustedness of the application server 104.

An "authenticated client" ACEE 708 is created when the client 102 has supplied host authentication credentials to the application server 104. The application server 104 specifies the client's host authentication credentials in its request to the OS kernel 112. By providing its host authentication credentials to the application server, the client 102 has indicated that it trusts the server to act on its behalf. Therefore, only the access rights of the client 102 are checked in any later access control requests from the application server 104 on behalf of that client, as explained below.

On the other hand, an "unauthenticated client" ACEE 708 is created when the client 102 is a "guest" user (such as a DCE principal) that is authenticated to the guest authentication system, but not to the host security server 114. In view of the limited trust afforded by the host system 108 in this situation, the access rights of both the client 102 and the application server 104 are checked in any later access control requests from the application server on behalf of that client, as explained below.

Upon receiving the ACEE 708 from the security server 114, the OS kernel 112 anchors the client ACEE 708 off the task control block (TCB) 704 for the newly created thread 602 before returning control to that thread 602 (step 308).

Referring back to FIG. 2, when the application server thread 602 needs to access a resource 110 (step 210), it issues a request to the OS kernel 112, which passes the request on to the host security server 114.

Figure 5:
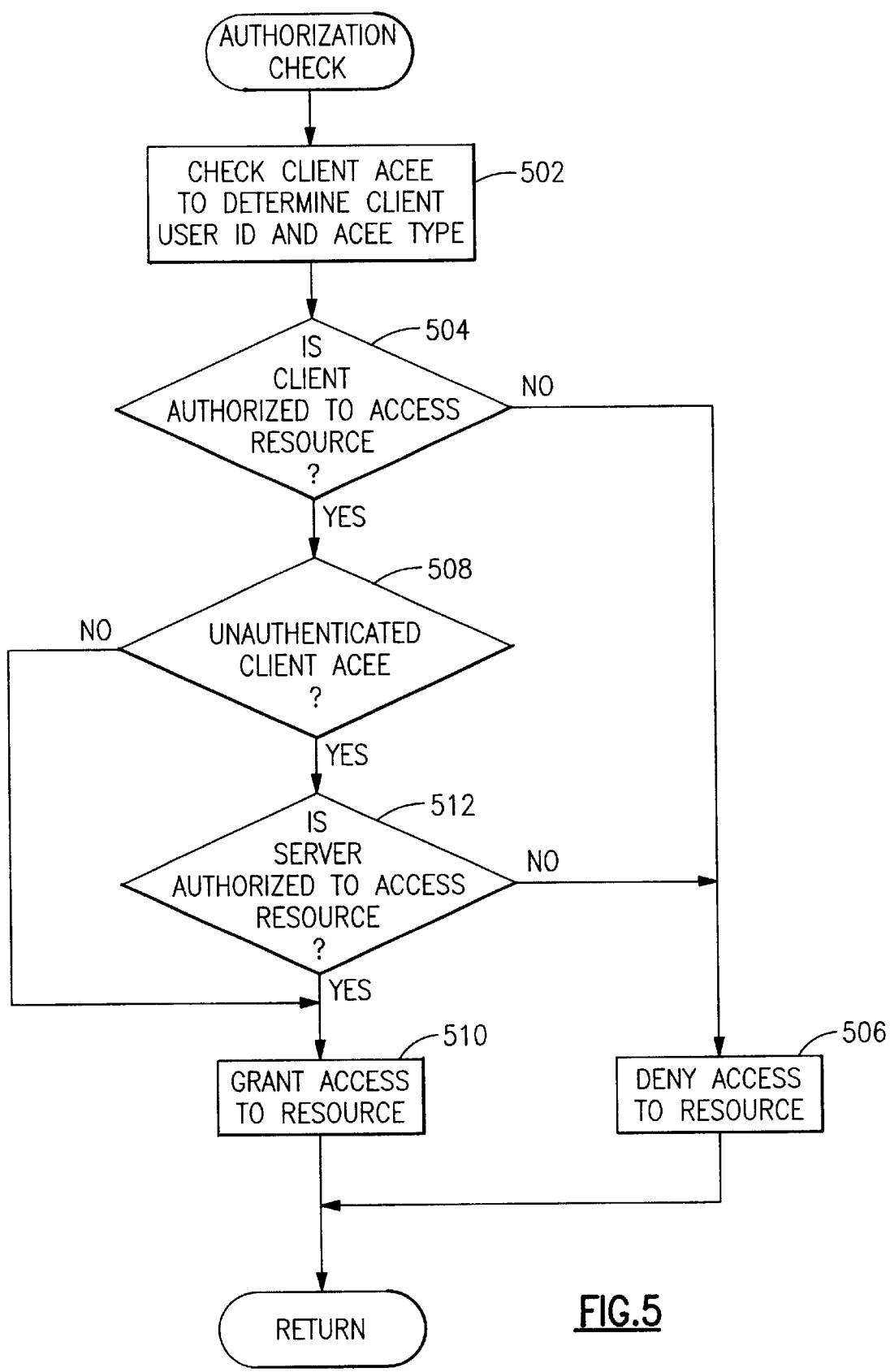
FIG. 5 shows the steps performed by the host security server of the system of FIG. 1 to process a request for access to a resource.

Referring to FIG. 5, upon receiving the resource access request from the application server 104 (via the OS kernel), the host security server 114 first examines the client ACEE 708 of the thread 602 within the server address space 600 from which the request originated (step 502). The security server 114 examines the client ACEE 708 to determine the host userid of the client 102 as well as to determine whether the client is a host-authenticated client or an unauthenticated client.

For either type of ACEE 708, the security server 114 first checks the host security database 116 to determine whether the client 102 specified in the client ACEE 708 is authorized to make the specified access to the resource 110 (step 504). If not, the security server 114 denies access to the resource 110 and terminates the authorization checking process (step 506).

If the client 102 specified in the ACEE 708 is authorized to make the specified access to the resource 110 (step 504), then the security server 114 determines whether the client ACEE 708 is for a client that has been authenticated to the host system 108 (step 508). If so, then the security server 114 grants access to the resource 110 and terminates the authorization checking process (step 510).

If the ACEE 708 is that of an unauthenticated client (i.e., not authenticated to the host system 108) then the security server 114 also examines the server ACEE 706 and checks the host security database 116 to determine whether the application server 102 specified in the server ACEE 706 is authorized to make the specified access to the resource 110 (step 512). If so, then the security server 114 grants access to the resource 110 and terminates the authorization checking process (step 510). Otherwise, the security server 114 denies access to the resource 110 and terminates the authorization checking process (step 506).

Referring again to FIG. 2, when the application server 104 has completed processing the request from the client 102, it deletes the client ACEE 708 and terminates the client thread 602 (or reassigns it to another client) (step 212).

The foregoing description assumed that the application server 104 was an "unauthorized" server. If the application server 104 is an authorized server, then only the client ACEE 708 is checked during the authorization checking procedure shown in FIG. 5. This may be accomplished in any one of several manners, such by as creating an "authenticated client" ACEE 708 for any client thread 602 of an authorized server, regardless of whether the client is authenticated to the host security server 114 or to a guest system.

What is claimed is:

1. In a client/server system in which a server executing on a host system performs application services for a client that involve accessing a host resource, said client and said server each having independently specified access rights to said host resource, a method of controlling server access to said host resource comprising the steps of:

upon receiving a request from a client for a service from a server, creating a client security context for said client, said client security context indicating whether said client is an authenticated client that is authenticated to said host system or an unauthenticated client that is not authenticated to said host system;

upon receiving a request for a specified access to a host resource from a server purporting to act on behalf of a client:

determining whether said client is allowed said access to said resource;

determining whether said client is an authenticated client or an unauthenticated client;

if said client is an authenticated client, granting said access to said host resource if said client is allowed said access to said host resource; and if said client is an unauthenticated client, determining whether said server is allowed said access to said resource independently of said client and granting said access to said host resource if both said client and said server are independently allowed said access to said host resource, otherwise, refusing said access to said host resource.

2. The method of claim 1, further comprising the step of:
storing access control information defining said access rights of said client and said server to said host resource.

3. The method of claim 1 in which the client security context created for the client is examined to determine whether the client is an authenticated client or an unauthenticated client.

4. In a client/server system in which a server executing on a host system performs application services for a client that involve accessing a host resource, said client and said server each having independently specified access rights to said host resource, a method of controlling server access to said host resource comprising the steps of:
determining whether said client is allowed to make a requested access to said host resource;
determining whether said client is an authenticated client that is authenticated to said host system or an unauthenticated client that is not authenticated to said host system;
if said client is an authenticated client, granting said requested access to said host resource if said client is allowed to make said requested access to said host resource; and
if said client is an unauthenticated client:
determining whether said server is allowed to make said requested access to said host resource independently of said client; and
granting said requested access to said host resource only if both said client and said server are independently allowed to make said requested access to said host resource.

5. In a client/server system in which a server executing on a host system performs application services for a client that involve accessing a host resource, said client and said server each having independently specified access rights to said host resource, apparatus for controlling server access to said host resource comprising:
means responsive to the receipt of a request from a client for a service from a server for creating a client security context for said client, said client security context indicating whether said client is an authenticated client that is authenticated to said host system or an unauthenticated client that is not authenticated to said host system;
means responsive to the receipt of a request for a specified access to a host resource from a server purporting to act on behalf of a client for:
determining whether said client is allowed said access to said resource;
determining whether said client is an authenticated client or an unauthenticated client;
if said client is an authenticated client, granting said access to said host resource if said client is allowed said access to said host resource; and
if said client is an unauthenticated client, determining whether said server is allowed said access to said resource independently of said client and granting said access to said host resource if both said client and said server are independently allowed said access to said host resource, otherwise, refusing said access to said host resource.

6. The apparatus of claim 5, further comprising:
means for storing access control information defining said access rights of said client and said server to said host resource.

7. The apparatus of claim 5 in which the client security context created for the client is examined to determine whether the client is an authenticated client or an unauthenticated client.

8. In a client/server system in which a server executing on a host system performs application services for a client that involve accessing a host resource, said client and said server each having independently specified access rights to said host resource, apparatus for controlling server access to said host resource comprising:
means for determining whether said client is allowed to make a requested access to said host resource;
means for determining whether said server is allowed to make said requested access to said host resource independently of said client;
means for determining whether said client is an authenticated client that is authenticated to said host system or an unauthenticated client that is not authenticated to said host system;
means for granting said requested access to said host resource if said client is allowed to make said requested access to said host resource if said client is an authenticated client, and
means for granting said requested access to said host resource only if both said client and said server are independently allowed to make said requested access to said host resource if said client is an unauthenticated client.

9. A program storage device readable by a machine, tangibly embodying a program of instructions executable by the machine to perform method steps for controlling server access to a host resource in a client/server system in which a server executing on a host system performs application services for a client that involve accessing a host resource, said client and said server each having independently specified access rights to said host resource, said method steps comprising:
upon receiving a request from a client for a service from a server, creating a client security context for said client, said client security context indicating whether said client is an authenticated client that is authenticated to said host system or an unauthenticated client that is not authenticated to said host system;
upon receiving a request for a specified access to a host resource from a server purporting to act on behalf of a client:
determining whether said client is allowed said access to said resource;
determining whether said client is an authenticated client or an unauthenticated client;
if said client is an authenticated client, granting said access to said host resource if said client is allowed said access to said host resource; and
if said client is an unauthenticated client, determining whether said server is allowed said access to said resource independently of said client and granting said access to said host resource if both said client and said server are independently allowed said access to said host resource, otherwise, refusing said access to said host resource.

10. The program storage device of claim 9, further comprising the step of:

storing access control information defining said access rights of said client and said server to said host resource.

11. The program storage device of claim 9 in which the client security context created for the client is examined to determine whether the client is an authenticated client or an unauthenticated client.

12. A program storage device readable by a machine, tangibly embodying a program of instructions executable by the machine to perform method steps for controlling server access to a host resource in a client/server system in which a server executing on a host system performs application services for a client that involve accessing a host resource, said client and said server each having specified access rights to said host resource, said method steps comprising:

determining whether said client is allowed to make a requested access to said host resource;

determining whether said client is an authenticated client that is authenticated to said host system or an unauthenticated client that is not authenticated to said host system;

if said client is an authenticated client granting said requested access to said host resource if said client is allowed to make said requested access to said host resource; and if said client is an unauthenticated client:

determining whether said server is allowed to make said requested access to said host resource independently of said client; and granting said requested access to said host resource only if both said client and said server are independently allowed to make said requested access to said host resource.

\* \* \* \* \*